Oct. 24, 1950     R. E. DIETERICH     2,527,247
VISOR, PRINCIPALLY FOR ONE-PIECE WINDSHIELDS
Filed Sept. 9, 1949
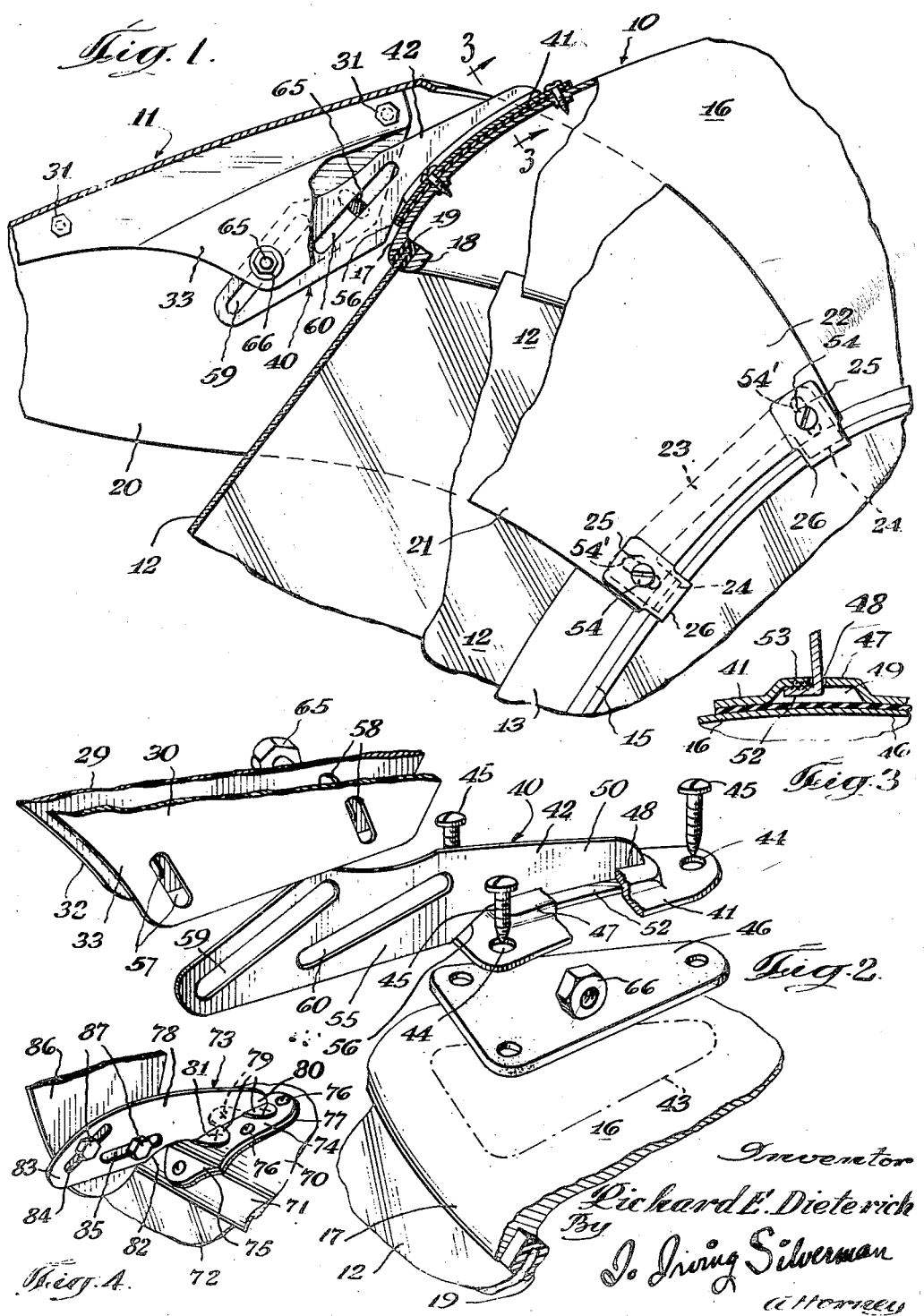

Patented Oct. 24, 1950

2,527,247

UNITED STATES PATENT OFFICE 2,527,247

VISOR, PRINCIPALLY FOR ONE-PIECE WINDSHIELDS

Richard E. Dieterich, River Forest, Ill.

Application September 9, 1949, Serial No. 114,721

13 Claims. (Cl. 296—95)

This invention relates to an automobile windshield shade or visor and more particularly is directed to means for supporting a shade or visor at its center in conjunction with means for adjusting the pitch and height thereof relative to the windshield proper. My invention is especially adapted for visors which shade one-piece windshields, but is not limited thereto.

The apparatus which is contemplated by this invention gives rise to many advantages with respect to the attachment to and adjustment of the visor or shade on the body of an automobile. The visor is rigidly supported at its center thereby being adapted better to withstand the great wind forces to which it is subjected when the automobile is being driven at a high rate of speed. In conjunction therewith is provided an easily accessible adjusting means for varying the height of the shade from the windshield and the pitch thereof relative to the windshield.

The above advantages are only a few of those which are achieved by the use of a visor of the type contemplated by my invention. They are better comprehended when considered in light of the type of windshield structures provided on modern automobiles. These are mainly of two types which are referred to herein as "one-piece" and "two-piece" windshields respectively. In the "two piece" windshield there are two panels of glass separated by a center molding strip upon which may be secured a clamping bracket for supporting the visor or shade at its center. This structure is not entirely satisfactory since the bracket interferes with the unhampered view of the driver of the vehicle. Moreover, there is a tendency for present day automobiles to be constructed with only one piece windshields, eliminating the center molding strip by means of which the visor heretofore could be supported at its center. Where the visor is installed without the utilization of center supporting means, said visor is susceptible to being torn off by the wind or otherwise damaged when the automobile is driven at high speeds. Of necessity, most automobile visors are flexible and to secure the ends only of the visor to the sides of the vehicle body would give rise to noise and vibration at the center, and, in addition, strain at the center of the visor by bending and buckling may even cause breakage. In any event, a visor secured to an automobile without a central supporting structure is dangerous and undesirable.

My present invention obviates the disadvantages of prior structures in providing cheap, simple, sturdy, easily secured center supporting means for a vehicle visor which will enable the visor safely and durably to be secured in proper shading position relative to a windshield which is or is not provided with a center molding strip.

Another object of the invention is to provide novel structure for adjusting the height and pitch of the visor relative to the vehicle windshield in a facile manner and without the use of special tools.

With the foregoing and other objects in view which will appear as the description proceeds, the invention consists of certain novel features of construction, arrangement, and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a median sectional view taken through a visor constructed in accordance with my invention, portions being shown broken away and in elevation in order clearly to illustrate the details thereof.

Fig. 2 is a fragmentary perspective exploded view showing the parts of my new construction, portions being broken away to illustrate certain details.

Fig. 3 is a sectional view taken through the center support means of the visor along the line 3—3 of Fig. 1 and in the general direction indicated.

Fig. 4 is a fragmentary perspective view of a modified form of the center support construction of my invention.

Prior to entering upon a detailed discussion of the construction of my invention, it is desired to point out that same is applicable to a wide variety of visors and vehicles. The construction of the visor itself as well as that of the vehicle may be entirely different from the constructions illustrated and described herein. Thus for example, the vehicle may have a two-piece windshield, since my construction is applicable as well to windshields which have a center molding strip as it is to those that do not. Likewise, the visor may be formed of one, two, or three panels, and may be constructed in a variety of ways and designs. Furthermore, the ends of the visor may be attached by clamping means, screw-on means, or any other expedient.

I contemplate that my invention will be useful with visors capable of being adjusted at all points of attachment for height and pitch, but I do not wish to be precluded from asserting claim to a visor utilizing my construction which has its ends secured permanently to the vehicle. The center of such a visor could well be so flexible to permit of sufficient bending to enable pitch and height to be adjusted to a limited extent by means of my new construction.

Referring specifically to the construction which has been illustrated herein, attention is invited to the fact that the visor is formed of two panels which meet at the center of the windshield and are provided at this point with flanges or fins, the fins sandwiching the center support plate therebetween. Obviously, the fins may be formed on the bottom of a single panel covering the entire vehicle windshield. Likewise, I have illustrated a construction in which only one fin is provided. Attention is invited to a construction which utilizes only one fin and with which my invention can be associated, same being set forth in some detail in my copending application Serial No. 111,152, filed August 19, 1949, and entitled Vehicle Windshield Shade. In said copending application, the details of a manner of securing the ends of a visor to a vehicle by clamping brackets secured to the vehicle rain gutters are elucidated. The manner of securing the visor illustrated herein is a variation of the clamping method, but the invention is not intended to be limited thereby.

Referring now to the figures, the reference character 10 designates generally a vehicle having my new visor designated generally 11 in proper shading relationship to the windshield 12 of the vehicle. The windshield 12 is here shown as a single glass member bent to conform to the contours of the forward portion of the vehicle cab. This, in other words, is a one-piece windshield. The side post of the windshield is shown at 13 terminating in the trough or rain gutter 15 which is generally the present day construction. The vehicle is shown provided with a metal roof 16 terminating at its forward edge in a molding or thickened portion 17 which engages the upper edge of the windshield 12. The molding 17 may include a trim or framing member, but since same forms no part of the invention no details are shown. Likewise, on the interior of the vehicle 10 a simple bead 18 is shown, but the structure may be more complex, not being illustrated to keep the explanation as simple as possible. There is illustrated at 19 a channel member of rubber or other yieldable material within which the edge of the windshield glass 12 is seated, rendering the juncture of the windshield 12 with the vehicle 10 waterproof and shock absorbing.

It is desired to point out that the roof 16 is generally curved forwardly and downwardly in accordance with modern vehicle design, since this is considered in the construction of an important part of my invention.

The principal feature of construction of my new visor is concerned with the center support bracket by means of which, instead of being supported at its center from the windshield 12, or upon a strip (not shown) dividing the windshield the major portion of the support is derived from the vehicle roof 16. With this in mind, the construction of the visor 11 will now be described, prior to entering upon a discussion of the details of the center bracket.

The visor 11 is formed of a pair of elongate panel members 20 and 21 which are generally wide at the center of the vehicle and taper to relatively narrow dimensions at the ends thereof as illustrated at 22. The narrowed portions 22 are intended to be secured adjacent the posts 13 on opposite sides of the vehicle alongside the ends of the windshield 12 and for this purpose each is provided on the inner surface with an anchor member 23 having feet 24 that fit into the trough part of the gutter 15, i. e., on the inside thereof, while the outside surface is provided with a pair of brackets 25, which have feet 26 that hook in under the gutter 15 on the outside thereof, and by reason of bolts 54 passing through the brackets 25, the anchor member 23 and the end 22 of the visor panel 21, the visor 11 can be clamped to the gutters on opposite sides of the vehicle 10 by screwing the bolts home.

In the version of my invention shown, the center ends of the panels 21 and 20 meet in flanges 29 and 30 which may be bent downwardly from the respective panels 20 and 21 and fastened together by appropriate fastening means 31 so as to form a downwardly extending fin substantially perpendicular to the visor 11 at the center thereof. If desired, the lower ends 32 and 33 of the flanges 29 and 30 may be offset outwardly, as shown in Fig. 2, i. e., away from one another for the purpose of forming a space to accommodate the central beam of the bracket to be described.

The bracket for supporting the center of the visor 11 is designated generally 40 and consists of a base plate 41 and the vertically arranged plate member 42 secured perpendicular thereto and acting as a supporting beam. The base plate 41 is of generally triangular construction and is curved to follow generally the forward contours of the roof 16. In Fig. 2 I have shown a phantom outline 43 in broken lines, illustrating the position of the base plate 41 installed upon the roof 16. At each of its corners, the base plate 41 is provided with perforations 44 for receiving the tapping screws 45 by means of which the bracket 40 is secured to the roof 16. Appropriate pilot holes are drilled in the conventional manner prior to driving home the screws 45. A sealing gasket member 46 of rubber or other deformable material is inserted between the base plate 41 and the roof 10 in order to render the connection water-tight.

At its center along the length of the base plate 41, there is provided an upset ridge 47 having a central slot 48 and providing thereby a cavity 49 on the underside of the base plate 41 as illustrated in Fig 3. Disposed within the slot 48 is the end 50 of the plate member or beam 42. The lower edge of the end 50 is bent at right angles to the body of the plate member 42 to form a flange 52 secured to the underside of the ridge 47 in the cavity 49 by means of welding or the like as indicated at 53. The end 50 is thereby rigidly secured to the base plate 41. If desired, the beam 42 may be a compound member formed of two plate members laminated together so that instead of a single flange 52, a pair of outwardly flared flanges could be formed to extend into both sides of cavity 49.

The point of the roof where the bracket 40 is secured is considerably above the major portion of the visor 11 because obviously the windshield 12 to be shaded is below said point. Consequently the end portion 50 is relatively short in height above the roof 16, and the forward portion 55 widens out and actually extends forward and downward relative to the base plate 41. The forward portion 55 clears the forward molding 17 of the roof 16 at 56.

Referring now to the flanges 29 and 30, the lowermost portions 32 and 33 thereof are provided with slots 57 and 58 spaced apart. The forward portion 55 of the beam 42 has a pair of elongated slots 59 and 60 which are generally perpendicular to the slots 57 and 58 respectively, but are each generally aligned to lie on circles having as their center the pivot point of the entire visor as it may be rotated to vary the pitch thereof. Thus for example, the center of such circles could be a point lying between the bolts 54. Obviously, the slots 59 and 60 are arranged at a slight angle one relative to the other to permit pitch adjustments. If desired, the openings for bolts 54 may be slotted as shown at 54' for the adjustment of pitch. Height adjustments are possible by reason of the slots 57 and 58. The bracket 40 is secured to the underside of the visor 11 by bolts 65 which pass through the slots and are secured by nuts 66.

The variation of the contours of the base plate 41 to fit the contours of any kind of vehicle roof is obvious. Thus in Fig. 4 I have shown a modified form of bracket which comes within the scope of the invention. There is shown a vehicle roof 70 which has an ornamental or functional forward molding 71 of lesser curvature than the roof 70 and to which the windshield glass 72 is secured. A bracket 73 is secured to the roof 70, said bracket comprising a base plate 74 formed to follow the roof contours as well as those of the molding 71 as shown at 75 and secured by the screws 76 which enter into the roof 70 and molding 71. A rubber seal 77 is also used for watertight connection. The center plate or beam 78 is provided along its rear bottom edge with flanged feet 79 integrally formed with and bent from the rear portion 80 of the beam 78 on both sides thereof, and being welded as shown at 81 to the base plate 74. There is a recess at 82 to permit clearance of the molding 71, and the forward portion 83 has the slots 84 and 85 formed therein to permit pitch variation. The only portion of the visor shown is a single depending fin 86 to which the bracket 73 is secured by bolts 87 in the same manner as described in connection with the structure described in Figs. 1, 2, and 3.

In referring to the plate members 42 and 78 as beams, it is desired to emphasize that each is a cantilever member secured at one end to the automobile roof and extending a substantial distance forward of its point of attachment, and supporting at its forwardly extending point the entire stress of the center of the respective visors. In every such case, due to the slant of modern vehicle windshields, and in order properly to support and position the visors relative thereto, the forward unsupported portion of the beam is considerably longer than the rear attached portion of the beam.

Thus it can be seen that I have provided a practical economical and efficient means for supporting a windshield visor at its center on a vehicle. Also, novel and improved means have been provided for adjusting the position of the windshield visor on the vehicle. It is believed that this invention, its mode of construction and assembly, and many of its advantages should be readily understood from the foregoing without further description, and it should be manifest that while preferred embodiments of the invention have been shown and described for illustrative purposes, the structural details are nevertheless capable of wide variation within the purview of this invention as defined in the appended claims.

What is claimed and desired to be secured by Letters Patent of the United States is:

1. In combination with an elongate shading member adapted to be secured to a vehicle having a windshield, in shading relationship to the windshield, and having the ends of said member secured to the vehicle alongside the windshield, said vehicle having a rigid roof portion bordering the top of the windshield, said shading member having a depending plate member on its underside at the center thereof substantially perpendicular to the shading member and parallel with the front-to-rear axis of the vehicle, a bracket adapted to be secured to the roof portion and having a forwardly directed extension engaged with said depending plate member and supporting the center of said shading member thereby.

2. In combination with an elongate shading member adapted to be secured to a vehicle having a windshield, in shading relationship to the windshield, and having the ends of said member secured to the vehicle alongside the windshield, said vehicle having a rigid roof portion bordering the top of the windshield, said shading member having a depending plate member on its underside at the center thereof substantially perpendicular to the shading member and parallel with the front-to-rear axis of the vehicle, a bracket adapted to be secured to the roof portion substantially above said plate member, and having a forwardly and downwardly directed extension engaged with the depending plate member for supporting the center of the shading member.

3. In combination with an elongate shading member adapted to be secured to a vehicle having a windshield, in shading relationship to the windshield, and having the ends of said member secured to the vehicle alongside the windshield, said vehicle having a rigid roof portion bordering the top of the windshield, said shading member having a depending plate member on its underside at the center thereof substantially perpendicular to the shading member and parallel with the front-to-rear axis of the vehicle, a bracket adapted to be secured to the roof portion substantially above said plate member, and having a forwardly and downwardly directed extension engaged with the depending plate member for supporting the center of the shading member, said extension comprising a second plate member perpendicular to said roof portion and parallel with said depending plate member and engaged thereto.

4. In combination with an elongate relatively flexible shading member adapted to be secured to a vehicle having a windshield, in shading relationship to the windshield, and having the ends of said member secured to the vehicle alongside the windshield, said vehicle having a rigid roof portion bordering the top of the windshield, said shading member having a depending plate member on its underside at the center thereof substantially perpendicular to the shading member and parallel with the front-to-rear axis of the vehicle, a bracket adapted to be secured to the roof portion substantially above said plate member, and having a forwardly and downwardly directed extension engaged with the depending plate member for supporting the center of the shading member, said extension comprising a second plate member perpendicular to said roof portion and parallel with said depending plate member and engaged thereto, said second plate member having slots substantially lying on curves centered on a line extending between said ends of said shading member and said first plate member having adjustable fastening means engaging within said slots whereby the pitch of the shading member may be varied to a limited extent by deforming the center thereof.

5. In combination with an elongate shading member adapted to be secured to a vehicle having a windshield, in shading relationship to the windshield, and having the ends of said member secured to the vehicle alongside the windshield, said vehicle having a rigid roof portion bordering the top of the windshield, said shading member having a depending plate member on its underside at the center thereof substantially perpendicular to the shading member and parallel with the front-to-rear axis of the vehicle, a bracket adapted to be secured to the roof portion substantially above said plate member, and having a forwardly and downwardly directed extension engaged with the depending plate member for supporting the center of the shading member, said extension comprising a second plate member perpendicular to said roof portion and parallel with said depending plate member and engaged thereto, said second plate member having slots substantially lying on curves centered on a line extending between said ends of said shading member and said first plate member having adjustable fastening means engaging within said slots, and said ends having limited pivotal attachment with said vehicle, whereby the pitch of said shading member may be varied to a limited extent.

6. In combination with an elongate shading member adapted to be secured to a vehicle having a windshield, in shading relationship to the windshield, and having the ends of said member secured to the vehicle alongside the windshield, said vehicle having a rigid roof portion bordering the top of the windshield, said shading member having a depending plate member on its underside at the center thereof substantially perpendicular to the shading member and parallel with the front-to-rear axis of the vehicle, a bracket adapted to be secured to the roof portion substantially above said plate member, and having a forwardly and downwardly directed extension engaged with the depending plate member for supporting the center of the shading member, said extension comprising a second plate member perpendicular to said roof portion and parallel with said depending plate member and engaged thereto, and cooperative fastening means connecting said plate members and including slots substantially perpendicular to said windshield whereby to enable limited adjustment of the spacing between the windshield and the center of said shading member.

7. In combination, a windshield shading member adapted to be secured in shading relationship to a vehicle windshield, said vehicle having a rigid roof portion bordering the top of the windshield, means on the ends of the member adapted to secure said ends to the vehicle alongside the windshield, and means for securing the center of the member to the center of the said roof portion comprising a depending fin on the underside of the member, a base plate member adapted to be secured to the center of said roof portion above the windshield, a vertically arranged cantilever beam rigidly secured to the base plate and extending forwardly thereof and thence downwardly a substantial distance below the level of the base plate, and engaged with the said fin for supporting same.

8. A bracket of the character described for supporting the center of a windshield shading member in proper spaced relationship to a vehicle windshield having a rigid roof portion adjacent the top thereof which comprises a base plate portion adapted to be secured to the center of said roof portion above the windshield, a cantilever beam rigidly secured at one end to said base plate and having the other end disposed a substantial distance on the opposite side of the plate to which said beam is secured with the body of the beam being curved around the plate whereby to clear the roof portion when said bracket is secured, the said other end being adapted for attachment to the center of said shading member.

9. A bracket of the character described for supporting the center of a windshield shading member in proper spaced relationship to a vehicle windshield having a rigid roof portion adjacent the top thereof which comprises a base plate portion adapted to be secured to the center of said roof portion above the windshield, a cantilever beam rigidly secured at one end to said base plate and having the other end disposed a substantial distance on the opposite side of the plate to which said beam is secured with the body of the beam being curved around the plate whereby to clear the roof portion when said bracket is secured, the said other end being adapted for attachment to the center of said shading member, said beam comprising a vertically arranged plate member perpendicular to said base plate and having the secured end thereof flanged and permanently attached to said base plate.

10. In combination with a shading member, adapted to be secured in shading relationship to a vehicle windshield, said vehicle having a roof contiguous to said windshield, a vertical fin secured to the underside of the member at the center thereof, a plate member secured to the fin and being adjustable relative thereto in two directions a limited extent, a base plate, said plate member being rigidly secured to said base plate, said base plate being arranged above the fin and adapted to be secured to the roof of said vehicle.

11. In combination with an elongate shading member adapted to be secured to a vehicle having a windshield, in shading relationship to the windshield, having the ends of the member secured to the vehicle alongside the windshield, and said vehicle having a rigid roof portion bordering the top of the windshield, a base member adapted to be secured to the roof portion, an elongate support member arranged to extend forwardly from the base member substantially parallel with the front-to-rear axis of the vehicle having one end rigidly secured to said base to withstand cantilever forces, and having the other end secured to the underside of said windshield shading member between the ends thereof.

12. In combination with an elongate shading member adapted to be secured to a vehicle having a sloped windshield, a rigid roof portion bordering the top of the windshield, said windshield shading member having its ends secured to the vehicle alongside of the windshield and being arranged in shading relationship to the windshield with a substantial portion thereof overlying the windshield, a rigid supporting bracket adapted to be secured to said roof portion and having an arm extending forwardly from the said roof portion to the underside of the said shading member and secured thereto for supporting the same in said position.

13. A bracket of the character described for securement to a vehicle roof for the support of a windshield visor over the windshield of said vehicle, said roof having a downwardly sloped forward portion, said bracket comprising a base portion adapted to be secured to said sloped roof portion, an arm having one end rigidly attached to the base portion and extending a substantial distance forwardly thereof and adapted to be poised above the said windshield and attached to the underside of said visor for supporting same over said windshield.

RICHARD E. DIETERICH.

REFERENCES CITED

The following references are of record in the file of this patent:

UNITED STATES PATENTS

| Number | Name | Date |
| --- | --- | --- |
| 2,334,856 | Atkinson | Nov. 23, 1943 |
| 2,500,406 | Greenfield | Mar. 14, 1950 |